Patented July 14, 1925.

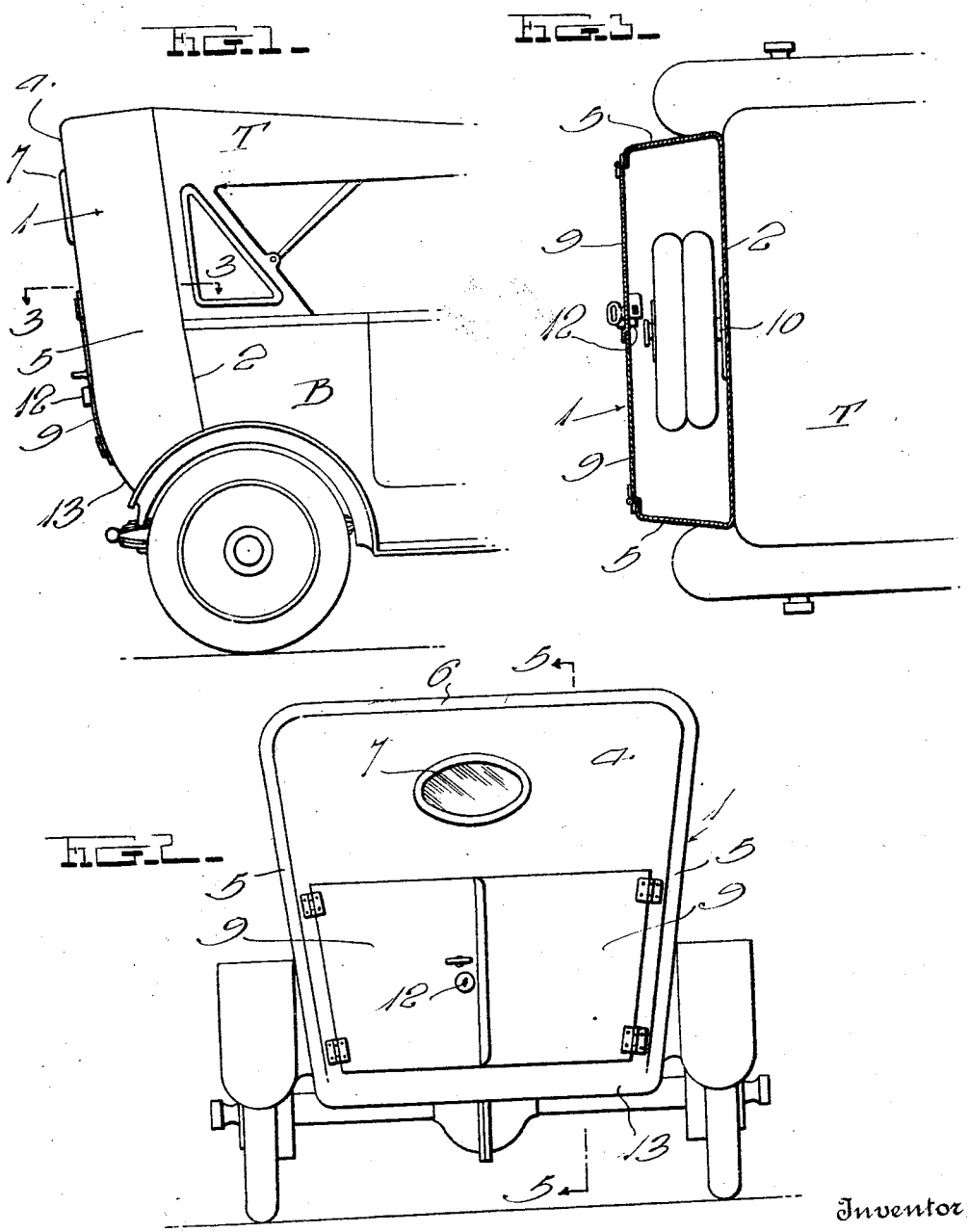

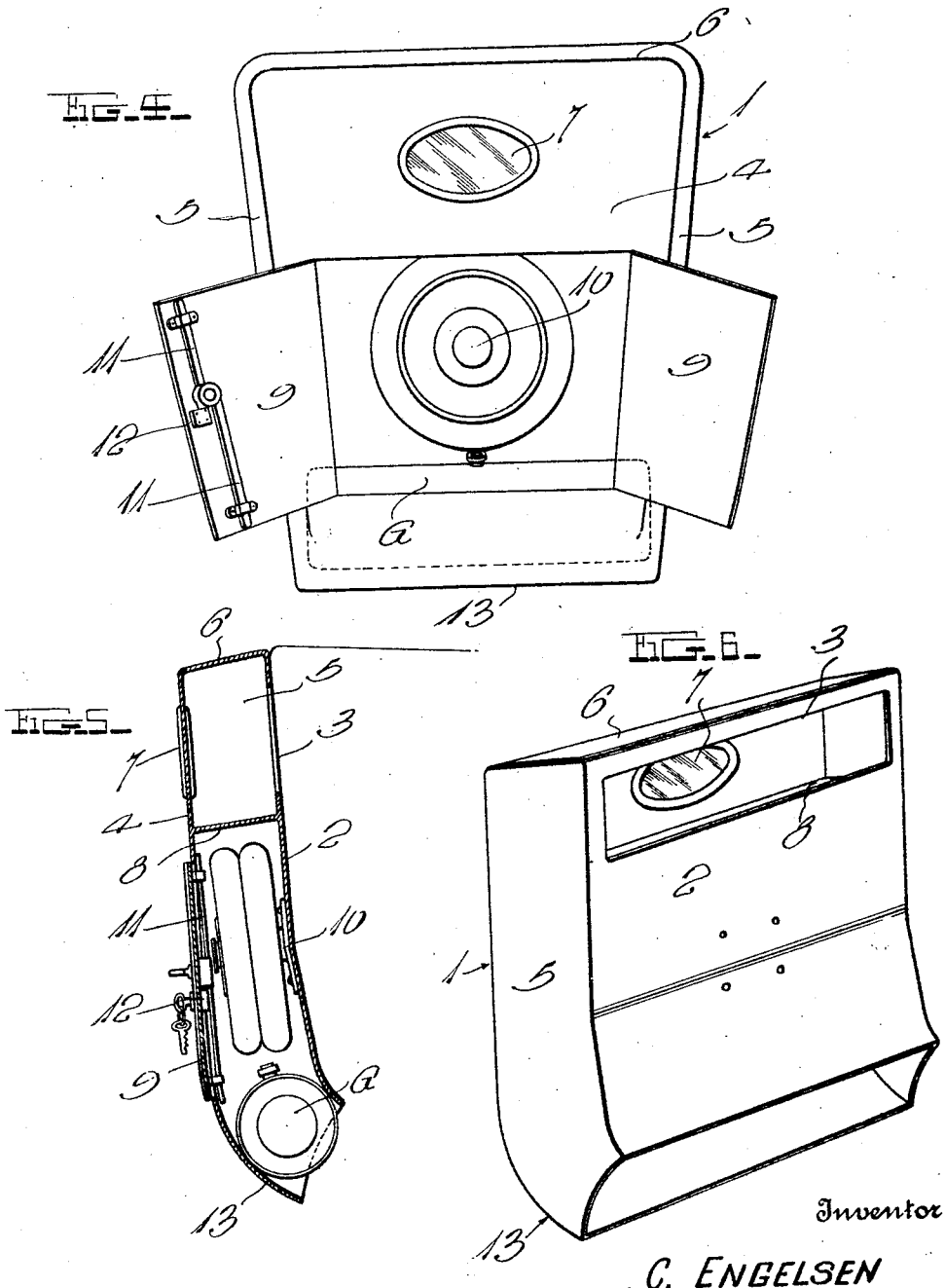

1,546,218

UNITED STATES PATENT OFFICE.

CHARLES ENGELSEN, OF SHERIDAN, ILLINOIS.

TIRE AND ARTICLE CARRYING ATTACHMENT FOR AUTOMOBILES.

Application filed September 22, 1924. Serial No. 739,174.

*To all whom it may concern:*

Be it known that I, CHARLES ENGELSEN, a citizen of the United States, residing at Sheridan, in the county of La Salle and State of Illinois, have invented certain new and useful Improvements in Tire and Article Carrying Attachments for Automobiles; and I do declare the following to be a full, clear, and exact description of the invention, such as will enable others skilled in the art to which it appertains to make and use the same.

My invention has for its object to provide a novel form of casing to cover the rear end of an automobile body and to extend upwardly therefrom to the top of the vehicle, the lower portion of said casing being adapted to contain the spare tire or tires, while the upper portion is provided in its rear side with a view opening and is open at its front side for registration with an opening in the back of the automobile top. Thus, not only can the driver see approaching vehicles at the back of his machine by looking rearwardly through the several openings but articles may be placed into and removed from the upper portion of the casing.

A further object is to extend the casing downwardly to such an extent as to cover the rear and lower sides of the usual gas tank, thereby preventing the theft of fuel.

With the foregoing in view, the invention resides in the novel subject matter hereinafter described and claimed, the description being supplemented by the accompanying drawings.

Figure 1 is a side elevation of a portion of an automobile equipped with my invention.

Figure 2 is a rear elevation.

Figure 3 is a horizontal sectional view as indicated by line 3—3 of Fig. 1.

Figure 4 is a rear elevation with the doors swung open to give access to the spare tires and the gas tank.

Figure 5 is a vertical sectional view as indicated by line 5—5 of Fig. 2.

Figure 6 is a perspective view of the attachment detached from the machine.

In the drawings above briefly described, the numeral 1 designates the casing constituting my invention, said casing being provided with a front wall 2 shaped for snug contact with the rear end of an automobile body B and of a height to extend above said body in contact with the rear end of the vehicle top T, the upper portion of said front wall 2 being provided with an opening 3 which preferably extends substantially throughout its width. This opening is adapted for communication with the usual view opening in the rear end of the top, after the glass or celluloid closure has been removed therefrom, or a larger opening may be cut in the top of any desired size to communicate with the opening 3.

The casing 1 is provided with a rear wall 4 held in spaced relation with the front wall 2 by upstanding side walls 5 and a top 6, the upper portion of said rear wall 4 being provided with a transparent panel 7 so that when the driver must look rearwardly, he can see through this panel and the registering openings in the front wall of the casing and the rear end of the automobile top. The provision of the opening 3 also permits articles to be placed in the upper portion of the casing 1 from the interior of the machine, said casing being provided with a horizontal partition 8 upon which such articles may rest.

Below the partition 8, the rear side wall 4 of the casing 1 is provided with a door or doors 9 for giving access to its interior, in which is located a suitable carrier 10 for spare tires or wheels, as the case may be. The door or doors 9, two being here shown, may well be held in closed position by any preferred lock-controlled means, but I have shown a pair of bolts 11 and a lock 12 controlling them, for this purpose.

The lower extremity of the casing 1 preferably turns forwardly as indicated at 13 and is open for reception of the usual gas tank G, said casing extending behind and under the tank so that the theft of fuel is prevented. I prefer that the filling opening of the tank shall be accessible only when the door or doors 9 are opened, but if desired this tank might be provided with a neck extending to the exterior of the casing.

The invention is highly advantageous for the purposes intended, may be easily attached to an automobile, and will not detract from the appearance of the machine in any manner. As excellent results may be obtained from the details disclosed, these details may be followed if desired, but it is to be understood that within the scope of the invention as claimed, numerous minor changes may be made.

Furthermore, while I have shown the invention on an open car, it may well be used on any of the well known closed types.

I claim:

1. An attachment for automobiles comprising a casing of a size to cover the rear end of an automobile body and the back of the automobile top, and having a partition between its upper and lower portions, the rear side of said casing having a transparent panel near its upper end while the front side of said casing is open at its upper portion to communicate with an opening in the back of the automobile top allowing the driver to look in rear of the car and permitting the placing of articles in and their removal from the upper portion of the casing, the lower portion of said casing having a door for giving access to its interior, and containing a tire carrier.

2. An attachment for automobiles comprising a casing of a size to cover the rear end of an automobile body and the back of the automobile top, and having a partition between its upper and lower portions, the rear side of said casing having a transparent panel near its upper end while the front side of said casing is open at its upper portion to communicate with an opening in the back of the automobile top allowing the driver to look in rear of the car and permitting the placing of articles in and their removal from the upper portion of the casing, the lower portion of said casing having a door for giving access to its interior, and containing a tire carrier, the lower extremity of said casing being adapted to cover the rear and lower sides of the usual gas tank to prevent theft of its contents.

In testimony whereof I have hereunto affixed my signature.

CHARLES ENGELSEN.